US008045465B2

(12) United States Patent
Coupechoux et al.

(10) Patent No.: US 8,045,465 B2
(45) Date of Patent: Oct. 25, 2011

(54) WIRELESS MOBILE TERMINAL AND TELECOMMUNICATION SYSTEM

(75) Inventors: Marceau Coupechoux, Paris (FR); Jérome Brouet, Paris (FR)

(73) Assignee: Alcatel Lucent, Paris (FR)

( * ) Notice: Subject to any disclaimer, the term of this patent is extended or adjusted under 35 U.S.C. 154(b) by 747 days.

(21) Appl. No.: 11/079,082

(22) Filed: Mar. 15, 2005

(65) Prior Publication Data

US 2005/0243718 A1   Nov. 3, 2005

(30) Foreign Application Priority Data

Apr. 5, 2004   (EP) .................................... 04290907

(51) Int. Cl.
   *H04L 1/00*   (2006.01)
(52) U.S. Cl. ......................... 370/232; 370/231; 370/235
(58) Field of Classification Search .................. 370/231, 370/229, 235, 395.52, 401, 232, 349, 338; 709/235
See application file for complete search history.

(56) References Cited

U.S. PATENT DOCUMENTS

| 7,187,666 B1* | 3/2007 | Farley et al. ................. 370/331 |
| 7,505,448 B2* | 3/2009 | Sheng et al. ................. 370/350 |
| 2002/0112057 A1 | 8/2002 | Srinivas et al. |
| 2005/0088972 A1* | 4/2005 | Zhang et al. ................. 370/235 |

FOREIGN PATENT DOCUMENTS

WO   WO 03/081873 A1   10/2003

OTHER PUBLICATIONS

Lampros Kalampoukas, et al. "Explicit Window Adaptation: A Method to Enhance TCP Performance", 1998 IEEE, pp. 242-251.
Fei Peng, et al.: "A Novel Fair Bandwidth Allocation Algorithm for TCP Window Control", Performance, Computing, and Communications Conference, 2003, pp. 317-324.
Aldar C. F. Chant, et al.: "TCP (Transmission Control Protocol) over Wireless Links" 1997 IEEE, pp. 1326-1330.
James Aweya, et al. "Enhancing Network Performance with TCP Rate Control", 2000, IEEE, pp. 1712-1718.

* cited by examiner

*Primary Examiner* — Pao Sinkantarakorn
*Assistant Examiner* — Chandrahas Patel
(74) *Attorney, Agent, or Firm* — Sughrue Mion, PLLC

(57) ABSTRACT

A wireless mobile terminal determining a size of an advertised window depending on a current data rate of a wireless downlink transmission is provided. The wireless mobile terminal receives from a transmission control protocol (TCP) sender a data packet comprising a header portion and a payload portion; and determines the current data rate of the wireless downlink transmission to the wireless mobile terminal from signaling information contained in the header portion of the data packet; and determines the size of the advertised window depending on the current data rate of the wireless downlink transmission.

12 Claims, 2 Drawing Sheets

WIRELESS MOBILE TERMINAL AND TELECOMMUNICATION SYSTEM

BACKGROUND OF THE INVENTION

The invention is based on a priority application EP 04 290 907.7 which is hereby incorporated by reference.

The present invention relates to the field of wireless telecommunication systems and more particularly without limitation to the usage of the transmission control protocol (TCP) over wireless links.

The transmission control protocol (TCP) originally has been designed and tuned for networks composed of wired links and stationary hosts. However, usage of TCP in a mobile wireless environment has also been considered in the prior art (cf. TCP (transmission control protocol) over wireless links, Vehicular Technology Conference, 1997 IEEE 47$^{th}$ Chan, A. C. F.; Tsang, D. H. K.; Gupta, S. Pages: 1326-1330 vol. 3).

In an Ethernet LAN (IEEE 802.3), the Carrier Sense Multiple Access with Collision Detection (CSMA/CD) protocol establishes how simultaneous transmissions (packet collisions) will be handled. In a WLAN, collision detection in this manner is not possible due to the fact that a station is not able to transmit and listen at the same time. To account for this difference, 802.11 uses a slightly different protocol known as Carrier Sense Multiple Access with Collision Avoidance (CSMA/CA) or the Distributed Coordination Function (DCF). CSMA/CA is based on a "listen before transmit" policy and attempts to avoid packet collisions by using explicit packet acknowledgement (ACK), which means that an ACK packet is sent by the receiving station to confirm that a packet arrived intact.

CSMA/CA works by having the station that wishes to transmit senses the air and if there is no activity detected, the station will wait an additional random period of time and if there still is no activity, will transmit the data. If the packet is received intact, the receiving station will send an ACK frame that once it is received by the original sender the transmission is complete. If the ACK command is not received in a specified random period of time, the data packet will be resent, assuming that the original packet experienced a collision.

A particular problem is created by the "near-far" effect in WLAN systems. Such systems face the so called near-far problem; the presence of a remote user in the cell in a low bit rate area e.g. at 1 megabit per second can greatly degrade the throughput of a high data rate user. The aggregate throughput of the cell is also affected. This phenomenon is due to the fact that all mobile terminals within a given cell have equal access probability to the same transmission medium. For equal packet sizes a packet transmitted at 1 megabit per seconds usually occupies the transmission medium 11 times longer than a packet transmitted at 11 megabits per second.

SUMMARY OF THE INVENTION

The present invention provides for a wireless mobile terminal comprising a TCP receiver and means for determining the size of an advertised window of the TCP receiver whereby the size of the advertised window depends on the data rate of the wireless transmission to the wireless mobile terminal. For example, the size of the advertised window is increased when the data rate is increased and vice versa.

This has the advantage that the advertised window size of the TCP receiver is limited when the wireless mobile terminal experiences relatively bad reception conditions and thus a transmission mode with a relatively low data rate. Limiting the size of the advertised window of the TCP receiver has a beneficial effect on the overall data transmission capacity.

In accordance with a further preferred embodiment of the invention the size of the advertised window determined by the wireless mobile terminal is transmitted to a TCP sender together with a TCP acknowledgment.

In another aspect the invention relates to a wireless mobile terminal that has a TCP sender. The wireless mobile terminal determines a data rate dependent window size depending on a current data rate of the uplink transmission. The data rate dependent window size is proportional to the data rate, i.e. a low data rate causes a small size of the data rate dependant window. The TCP sender receives an advertised window size from a TCP receiver in accordance with the TCP protocol.

For example, in the downlink (DL) the window size (WS) is driven by the mobile terminal (MT) which sets this size in the TCP acknowledgement (ACK) message and in the uplink (UL), the MT selects itself the WS by selecting the minimum value between the TCP sender WS and the WS which is dependent on the transmission mode, i.e. the physical data rate.

The wireless mobile terminal selects the minimum size of the data rate dependant window size and the advertised window size in order to determine the advertised window size to be used by the TCP sender. Again, this has a beneficial effect on the overall system throughput and data transmission capacity.

BRIEF DESCRIPTION OF THE DRAWINGS

In the following preferred embodiments of the invention will be described by way of example only in greater detail by making reference to the drawings in which.

DETAILED DESCRIPTION

Figure 1:
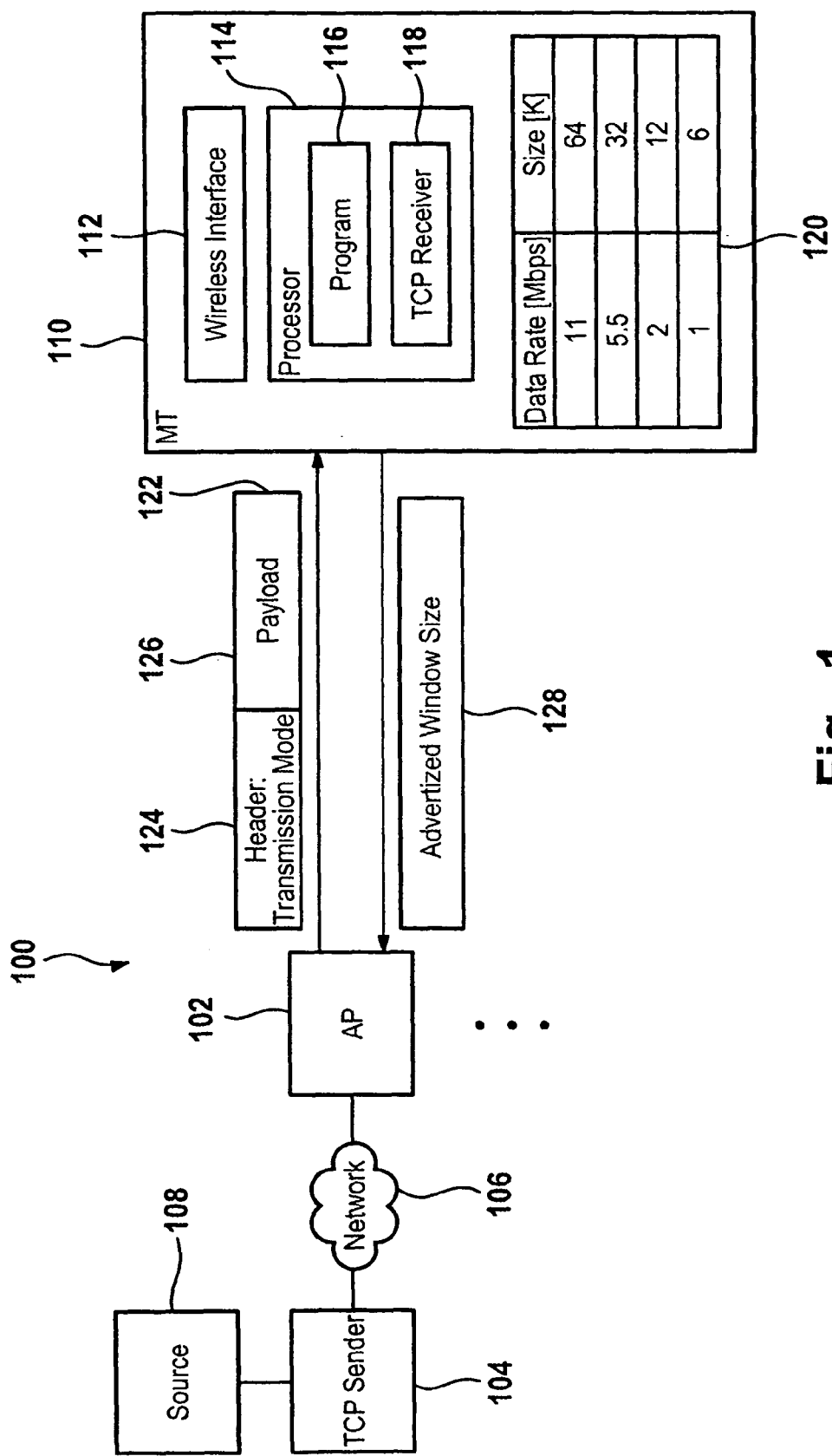
FIG. 1 is a block diagram of a wireless telecommunication system with a mobile terminal operating as TCP receiver.

FIG. 1 schematically shows cellular wireless telecommunication system 100 that has various access points 102 one of which is shown in FIG. 1 by way of example. For example, telecommunication system 100 is a wireless local area network (WLAN) system implementing the IEEE802.11b standard or another telecommunication standard.

Access point 102 is coupled to server computer 104 via internet protocol (IP) network 106; in the preferred embodiment considered here server computer 104 takes the role of a TCP sender in accordance with the transmission control protocol (TCP) protocol specification. Server computer 104 is coupled to a data source 108 which delivers user data for transmission to mobile terminal (MT) 110.

The mobile terminal 110 is within the coverage of access point 102. Mobile terminal 110 has wireless interface 112 including an antenna for establishing a wireless telecommunication link with access point 102. Further, mobile terminal 110 has processor 114 for running program modules 116 and 118. Program module 116 controls the overall operation of mobile terminal 110. Program module 118 implements a TCP receiver that is in compliance with the TCP protocol specification.

Mobile terminal 110 has storage 120 for storing a table. Each table entry consists of a data rate in megabits per seconds (Mbps) and an assigned size of the TCP receiver's advertised window. For example, if the data rate of the downlink transmission from the access point 102 to mobile terminal 110 is 11 megabits per second the advertised window size of the TCP receiver implemented by program module 118 is 64K. Hence, table 120 serves for storage of a set of predefined tuples of data rates and assigned advertised window sizes.

In operation a data packet 122 having header 124 and payload 126 is transmitted from access point 102 to mobile terminal 110. Header 124 carries signalling information that indicates the current physical transmission mode. This may include an explicit indication of the current data rate of the downlink connection or an indication of the current modulation and coding scheme that is being used for the downlink communication. A given modulation and coding scheme corresponds to a specific data rate of the downlink data transmission.

After receipt of data packet 122 by wireless interface 112 of mobile terminal 110 program module 116 determines the current data rate of the downlink communication from the signalling information contained in header 124 and uses the table stored in storage 120 to look up the size of the TCP receiver's advertised window for the given data rate. The size of the advertised window as determined from the table is entered into program module 118 that sends an acknowledgement 128 in accordance with the TCP protocol specification.

The acknowledgement 128 contains an indication of the advertised window size of the TCP receiver. This advertised window size transmitted together with acknowledgement 128 is transmitted from access point 102 over IP network 106 to the TCP sender implemented by server computer 104.

In accordance with the TCP specification the TCP sender maintains a congestion window which is an estimate of the number of data packets 122 that can be in transit without causing congestion. New data packets are only sent by the TCP sender if allowed by both this congestion window and the TCP receiver's advertised window. In other words, the TCP sender's transmission window is given by the minimum of the size of the advertised window and the size of the congestion window.

Various schemes for controlling the size of the congestion window for congestion avoidance have been devised in the prior art (cf. "Enhancing network performance with TCP rate control", Global Telecommunications Conference, 2000. GLOBECOM '00. IEEE Aweya, J.; Ouellette, M.; Montuno, D. Y.; Yao, Z. Page(s): 1712-1718 vol. 3; "Explicit window adaptation: a method to enhance TCP performance", INFOCOM '98, Seventeenth Annual Joint Conference of the IEEE Computer and Communications Societies. Proceedings. IEEE Kalampoukas, L.; Varma, A.; Ramakrishnan, K. K. Page(s): 242-251 vol. 1; "A novel fair bandwidth allocation algorithm for TCP window control", Performance, Computing, and Communications Conference, 2003. Conference Proceedings of the 2003 IEEE International Fei Peng; Leung, V. C. M.).

The TCP sender provided by server computer 104 can implement any of the known congestion avoidance schemes based on the advertised window size communicated with acknowledgement 128.

It is to be noted that setting the advertised window size in proportion to the downlink data rate is particularly advantageous for solution of the near-far problem that is experienced in multi-mode WLAN for TCP connections. In such multi-mode WLAN systems, the link layer of the protocol stack adapts the user data rate to the channel conditions. For example, in IEEE802.11b, as mobile terminal 110 goes away from access point 102 the data rate decreases from 11 megabit per second to 1 megabit per second with intermediate steps at 5.5 megabit per second and 2 megabit per second. Such systems face the so called near-far problem; the presence of a remote user in the cell in a low bit rate area e.g. at 1 megabit per second can greatly degrade the throughput of a high data rate user. The aggregate throughput of the cell is also affected. This phenomenon is due to the fact that all mobile terminals within a given cell have equal access probability to the same transmission medium. For equal packet sizes a packet transmitted at 1 megabit per seconds usually occupies the transmission medium 11 times longer than a packet transmitted at 11 megabits per second.

The near-far problem is solved in telecommunication system 100 by adapting the size of the advertised window to the current data rate, e.g. by means of the table stored in storage 120. By means of the table the advertised window size is decreased in proportion to a decrease of the data rate. As a consequence a fair bandwidth allocation is performed and the overall system throughput is increased.

Figure 2:
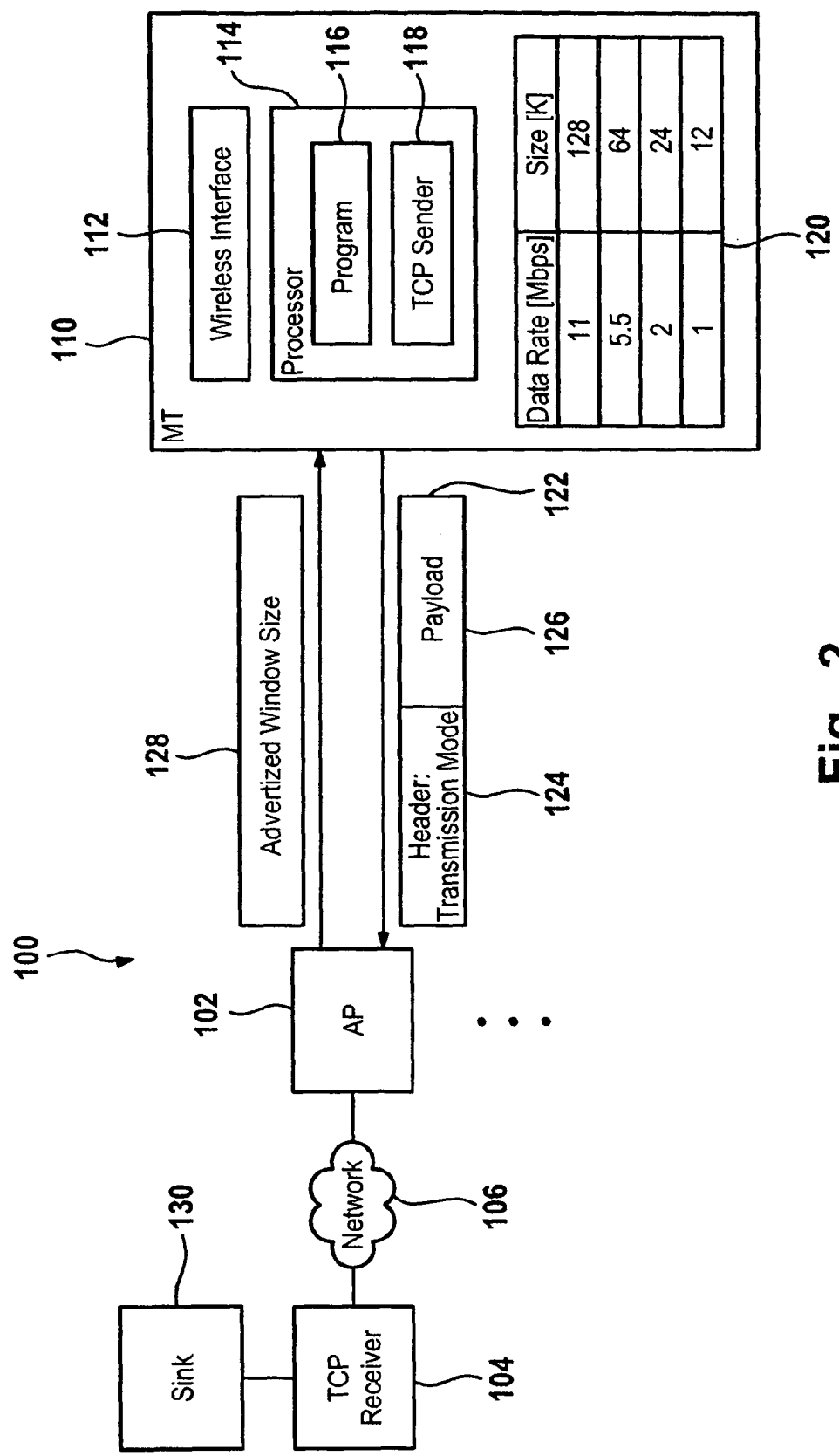
FIG. 2 is a block diagram of the telecommunication system of FIG. 1 with the mobile terminal operating as TCP sender.

An analogous approach is taken for the uplink case as it will be explained in more detail by making reference to FIG. 2.

In the uplink case server computer 104 implements a TCP receiver that is coupled to data sink 130. Program module 118 that is executed by a processor 114 of mobile terminal 110 implements a TCP sender.

In operation program module 116 determines the physical transmission mode for uplink transmission of data packet 122. Program module 116 uses the table stored in storage 120 to look up the size of the corresponding data rate dependant window. In addition, mobile terminal 110 receives acknowledgement 128 from the TCP receiver via access point 102.

Acknowledgement 128 carries the advertised window size as determined by the TCP receiver in accordance with the TCP protocol specification. Program module 116 selects the smaller window size from the advertised window size carried by acknowledgement 128 and the data rate dependant window size as looked up from the table stored in storage 120. The smaller of the two window sizes is entered into TCP sender as the advertised window size for the congestion control algorithm implemented in the TCP sender.

Again, this has the advantage of solving the near-far problem and to provide a fair bandwidth allocation to the mobile terminals within the cell covered by access point 102.

| List of Reference Numerals | |
|---|---|
| 100 | telecommunication system |
| 102 | access point |
| 104 | server computer |
| 106 | IP network |
| 108 | data source |
| 110 | mobile terminal |
| 112 | wireless interface |
| 114 | processor |
| 116 | program module |
| 118 | program module |
| 120 | storage |
| 122 | data product |
| 124 | header |
| 126 | pay load |
| 128 | acknowledgement |
| 130 | data sink |

The invention claimed is:
1. A wireless mobile terminal comprising:
transmission control protocol (TCP) receiver means receiving a data packet sent from a TCP sender, the data packet comprising a header portion and a payload portion;

means for determining a current data rate of a wireless downlink transmission to the wireless mobile terminal from signaling information contained in the header portion of the data packet; and means for determining a size of an advertised window depending on the current data rate of the wireless downlink transmission to the wireless mobile terminal, wherein the signaling information comprises information about the current data rate of the wireless downlink transmission to the wireless mobile terminal or information about a current modulation and a coding scheme, and wherein the means for determining the current data rate of the wireless downlink transmission to the wireless mobile terminal determines the current data rate from the information about the current data rate of the wireless downlink transmission to the wireless mobile terminal or the information about a current modulation and a coding scheme included in the signaling information.

2. The wireless mobile terminal of claim 1, the means for determining the size of the advertised window being adapted to increase the size of the advertised window when the data rate is increased and vice versa.

3. The wireless mobile terminal of claim 1, further comprising means for transmitting the size of the advertised window to a TCP sender with an acknowledgement via an access point.

4. A wireless telecommunication system comprising:
the TCP sender;
an access point through which at least one wireless mobile terminal of claim 1 receives the data packet from the TCP sender; and
the at least one wireless mobile terminal.

5. A method of determining a size of an advertised window for a transmission control protocol (TCP) receiver of a wireless mobile terminal, the method comprising:
receiving a data packet sent from a TCP sender at the TCP receiver, the data packet comprising a header portion and a payload portion;
determining a current data rate of a wireless downlink transmission to the wireless mobile terminal from signaling information contained in the header portion of the data packet; and
determining the size of the advertised window in proportion to the current data rate of the wireless downlink transmission to the wireless mobile terminal
wherein the signaling information comprises information about the current data rate of the wireless downlink transmission to the wireless mobile terminal or information about a current modulation and a coding scheme, and
wherein the determining the current data rate of the wireless downlink transmission to the wireless mobile terminal comprises determining the current data rate from the information about the current data rate of the wireless downlink transmission to the wireless mobile terminal or the information about a current modulation and a coding scheme included in the signaling information.

6. A non-transitory computer-readable recording medium having recorded thereon a program for executing a method of determining a size of an advertised window for a transmission control protocol (TCP) receiver of a wireless mobile terminal, the program being executed by a computer or a processor, and the method comprising:
receiving a data packet sent from a TCP sender at the TCP receiver, the data packet comprising a header portion and a payload portion;
determining a current data rate of a wireless downlink transmission to the wireless mobile terminal from signaling information contained in the header portion of the data packet; and
determining the size of the advertised window in proportion to the current data rate of the wireless downlink transmission to the wireless mobile terminal,
wherein the signaling information comprises information about the current data rate of the wireless downlink transmission to the wireless mobile terminal or information about a current modulation and a coding scheme, and
wherein the determining the current data rate of the wireless downlink transmission to the wireless mobile terminal comprises determining the current data rate from the information about the current data rate of the wireless downlink transmission to the wireless mobile terminal or the information about a current modulation and a coding scheme included in the signaling information.

7. A non-transitory computer-readable recording medium having recorded thereon a program for executing a method of determining a size of an advertised window for a transmission control protocol (TCP) sender of a wireless mobile terminal, the program being executed by a computer or a processor, and the method comprising:
sending a data packet to a TCP receiver, the data packet comprising a header portion and a payload portion;
determining a current data rate of a wireless uplink transmission to the TCP receiver from signaling information contained in the header portion of the data packet;
determining a first data rate dependent window size depending on the current data rate of the wireless uplink transmission;
receiving a second advertised window size from the TCP receiver; and
selecting a minimum of the first data rate dependent window size and the second advertised window size as the size of the advertised window size for usage by the TCP sender,
wherein the signaling information comprises information about the current data rate of the wireless uplink transmission to the TCP receiver or information about a current modulation and a coding scheme, and
wherein the determining the current data rate of the wireless uplink transmission to the TCP receiver comprises determining the current data rate from the information about the current data rate of the wireless uplink transmission to the TCP receiver or the information about a current modulation and a coding scheme included in the signaling information.

8. The non-transitory computer-readable recording medium of claim 7, wherein the determining the first data rate dependent window size is performed using pre-defined tuples of first sizes and data rates for determination of the first data rate dependent window size.

9. A wireless mobile terminal comprising:
transmission control protocol (TCP) sender means sending a data packet to a TCP receiver, the data packet comprising a header portion and a payload portion;
means for determining a current data rate of a wireless uplink transmission to the TCP receiver from signaling information contained in the header portion of the data packet;
means for determining a first data rate dependant window size depending on the current data rate of the wireless uplink transmission;

means for receiving a second advertised window size from the TCP receiver;

means for selecting a minimum advertised window size from the first data rate dependant window size and the second advertised window size for usage by the TCP sender means, wherein the signaling information comprises information about the current data rate of the wireless uplink transmission to the TCP receiver or information about a current modulation and a coding scheme, and wherein the means for determining the current data rate of the wireless downlink transmission to the TCP receiver determines the current data rate from the information about the current data rate of the wireless uplink transmission to the wireless mobile terminal or the information about a current modulation and a coding scheme included in the signaling information.

10. A wireless telecommunication system comprising:
a TCP receiver;
an access point through which at least one wireless mobile terminal of claim 4 sends the data packet to the TCP receiver; and
the at least one wireless mobile terminal.

11. The wireless mobile terminal of claim 9, the means for determining the first data rate dependant window size being adapted to determine the first data rate dependant window size in proportion to a physical data rate of the wireless uplink transmission.

12. A method of determining a size of an advertised window for a transmission control protocol (TCP) sender of a wireless mobile terminal, the method comprising:
sending a data packet to a TCP receiver, the data packet comprising a header portion and a payload portion;
determining a current data rate of a wireless uplink transmission to the TCP receiver from signaling information contained in the header portion of the data packet;
determining a first data rate dependent window size depending on the current data rate of the wireless uplink transmission;
receiving a second advertised window size from the TCP receiver; and
selecting a minimum of the first data rate dependent window size and the second advertised window size as the size of the advertised window size for usage by the TCP sender,
wherein the signaling information comprises information about the current data rate of the wireless uplink transmission to the TCP receiver or information about a current modulation and a coding scheme, and
wherein the determining the current data rate of the wireless uplink transmission to the TCP receiver comprises determining the current data rate from the information about the current data rate of the wireless uplink transmission to the TCP receiver or the information about a current modulation and a coding scheme included in the signaling information.

* * * * *